US008005710B2

(12) United States Patent
Vishnumurty et al.

(10) Patent No.: US 8,005,710 B2
(45) Date of Patent: Aug. 23, 2011

(54) METHODS AND SYSTEMS FOR CACHING AND SYNCHRONIZING PROJECT DATA

(75) Inventors: Rajendra Vishnumurty, Bellevue, WA (US); Sudin Bhat, Redmond, WA (US); Raju Iyer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1271 days.

(21) Appl. No.: 10/952,284

(22) Filed: Sep. 28, 2004

(65) Prior Publication Data

US 2006/0070019 A1      Mar. 30, 2006

(51) Int. Cl.
*G06Q 10/00* (2006.01)

(52) U.S. Cl. ............................. 705/8; 707/637; 707/638

(58) Field of Classification Search .................. 705/8
See application file for complete search history.

(56) References Cited

U.S. PATENT DOCUMENTS

| | | | | |
|---|---|---|---|---|
| 5,600,834 A * | 2/1997 | Howard | ........................ | 713/178 |
| 5,826,239 A * | 10/1998 | Du et al. | ............................ | 705/8 |
| 5,923,552 A * | 7/1999 | Brown et al. | .................. | 700/100 |
| 5,924,096 A | 7/1999 | Draper et al. | .......................... | 1/1 |
| 6,026,410 A * | 2/2000 | Allen et al. | ................. | 707/104.1 |
| 6,029,175 A * | 2/2000 | Chow et al. | ............................ | 1/1 |
| 6,321,236 B1 * | 11/2001 | Zollinger et al. | ..................... | 1/1 |
| 6,345,259 B1 * | 2/2002 | Sandoval | .......................... | 705/7 |
| 6,415,259 B1 * | 7/2002 | Wolfinger et al. | ................. | 705/8 |
| 6,487,469 B1 * | 11/2002 | Formenti | ........................ | 700/97 |
| 6,487,560 B1 * | 11/2002 | LaRue et al. | .................. | 707/625 |
| 6,519,763 B1 * | 2/2003 | Kaufer et al. | ................. | 717/101 |
| 6,622,152 B1 * | 9/2003 | Sinn et al. | ..................... | 707/637 |
| 7,092,972 B2 * | 8/2006 | Kashyap | ....................... | 707/625 |
| 7,162,499 B2 * | 1/2007 | Lees et al. | ..................... | 709/220 |
| 7,181,731 B2 * | 2/2007 | Pace et al. | ..................... | 717/136 |
| 2001/0056362 A1 * | 12/2001 | Hanagan et al. | ..................... | 705/7 |
| 2002/0120785 A1 | 8/2002 | Somalwar et al. | ............ | 719/310 |

FOREIGN PATENT DOCUMENTS

| | | |
|---|---|---|
| WO | WO98/54662 | 12/1998 |
| WO | WO2004/068469 | 8/2004 |

OTHER PUBLICATIONS

Business Communications Review, Rudd, Susan E., "Bringing wireless data communications into the midstream", Nov. 1993, v23, n11, p. 39.*
"Mobile Information Access", M Satyanarayanan—IEEE Personal Communications, 1996—reports-archive.adm.cs.cmu.edu.*
Data caching issues in an information retrieval system—R Alonso, D Barbara, H Garcia-Molina—ACM Transactions on Database Systems (TODS), 1990—portal.acm.org.*
Translucent Cache Management for Mobile Computing MR Ebling-1998—reports-archive.adm.cs.cmu.edu.*

(Continued)

*Primary Examiner* — Jonathan G Sterrett
(74) *Attorney, Agent, or Firm* — Merchant & Gould (57) ABSTRACT

Methods and systems are provided for intelligently managing project data in a project management application. According to various aspects of the invention, project management data may be loaded and saved to a local cache of a client computer, such as a hard disk cache. The invention also provides a mechanism for reducing the size of data downloaded from and sent to a project server during load and save times.

24 Claims, 5 Drawing Sheets

OTHER PUBLICATIONS

"Collaborative document monitoring" N Glance, JL Meunier, P Bernard, D Arregui—Proceedings of the 2001 . . . , 2001—portal.acm.org.*

Mobile Aleph: A System for Distributed Mobile Applications M Coglianese—cs.brown.edu, 2000.*

CPU reservations and time constraints: Efficient, predictable scheduling of independent activities—▶ psu.edu [PDF] MB Jones, D Roşu, MC Roşu—ACM SIGOPS Operating Systems Review, 1997—portal.acm.org.*

Application-Specific File Caching for Unmodified Applications and Kernels O Traub, A Lloyd, J Ledlie-2002—pdos.csail.mit.edu.*

Proxy cache algorithms: design, implementation, and performance J Shim, P Scheuermann, R Vingralek—IEEE Trans Knowl Data Eng, 1999—csa.com.*

Data management for pervasive computing M Cherniack, MJ Franklin, SB Zdonik—Proceedings of the 27th . . . , 2001—ece.northwestern.edu.*

Effective change detection using sampling—▶ psu.edu [PDF] J Cho, A Ntoulas—Proceedings of the 28th international conference on . . . , 2002—portal.acm.org.*

"Report from Microsoft's Project Technical 1-26 Briefing"; Sep. 21, 2004; pp. 1-5 (XP002407001).

CN200510089362.3 Office Action Apr. 13, 2010, with translation.

CN200510089362.3 Office Action Sep. 20, 2010, with translation.

Hupfeld, F.; Log-structured storage for efficient weakly-connected replication; Distributed Computing Systems Workshops; 2004; Proceedings, 24th International Conference; Hachioji, Tokyo, Japan; Mar. 23-24, 2004, Piscataway, NJ, USA, IEEE, Mar. 23, 2004, pp. 458-464 (XP010695646).

Okubo, T., et al.; Practical experiences of designing a distributed collaborative system; Enterprise Distributed Object Computing Conference, 2000; EDOC 2000 Proceedings; Fourth International, Makuhari, Japan; Sep. 25-28, 2000; Los alamito, CA, USA, IEEE Comput. Soc. US; Sep. 25, 2000 (XP010521572).

Pyron, T.; Special Edition Using Microsoft Office Project 2003; Feb. 3, 2004 (XP002406984).

EP 05105360.1 Search Report Nov. 24, 2006.

EP 05105360.1 Office Action Mar. 10, 2008.

* cited by examiner

METHODS AND SYSTEMS FOR CACHING AND SYNCHRONIZING PROJECT DATA

FILED OF THE INVENTION

The present invention generally relates to project management methods and systems. More particularly, the present invention relates to methods and systems for intelligently managing project data when using a project management application.

BACKGROUND OF THE INVENTION

With the advent of the computer age, computer and software users have grown accustomed to user-friendly software applications that help them write, calculate, organize, prepare presentations, send and receive electronic mail, make music, and the like. Modem word processing applications, for example, allow users to create and edit a variety of useful documents. Modem project management applications, as another example, allow users to create project management schedules for organizing and managing tasks, resources and labor associated with a variety of projects.

Manual and computerized project management systems allow managers and planners to organize and plan the tasks, resources and schedules required for completion of a given project. In most projects, a number of dependencies and constraints dictate the timing and completion of an overall project and of sub-projects comprising the overall project. For example, in a house construction project, a drywall sub-project may not typically begin until the completion of electrical work. And, a number of sub-projects may be constrained by the availability of labor and resources. Project management software applications have been developed for creating and automating project management schedules. With many such systems, tasks or sub-projects comprising an overall project are set out in scheduling charts, such as Gantt Charts, showing start dates and finish dates for given milestones and associated tasks comprising the overall project and providing information regarding utilized resources and constraints associated with the milestones and tasks comprising the project.

Currently, some project management software applications utilize a client/server architecture to manage projects. In many if these applications, the server is used to store the majority of project related data. That is, most of the project data is maintained on the server, allowing access by multiple users. In some cases the size of the data on the server can be very large. Typically, all of the data is sent to or pulled from the server when a user saves or loads a project. These issues tend to be a major problem when attempting to save or retrieve large amounts of data to and from the server. Load and latency issues may be exacerbated when a number of clients connect to the server and attempt save and load operations. Moreover, it can be quite cumbersome when attempting to load/save large amounts of data from the server, resulting in lost efficiency and increased costs. The performance problems can be particularly acute when the client is connected to the server over a low-bandwidth WAN connection.

SUMMARY OF THE INVENTION

Embodiments of the present invention solve the above and other problems by providing methods and systems for managing project data by intelligently caching and synchronizing the data using a project management application. One embodiment of the invention provides a method for managing data of a project management application by generating a project schedule including project data, monitoring changes to the project schedule, and determining whether a threshold is met according to the monitored changes. Another embodiment of the invention provides a method for managing project data of a project management application by receiving project data associated with a project, determining a difference of the data by comparing the received project data with stored project data, and updating the project data in the project based on the determined difference. Yet another embodiment of the invention provides a method for managing project data of a project management application by requesting a project including project data, sending a first version stamp associated with the project, and receiving project data based on a comparison of data associated with the first version stamp and a second version stamp.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to methods and systems for caching project data when using a project management application. The methods and systems utilize a local cache of a client computer to store project data using a program management application. When a user wishes to save or load data from a project server/database, the invention tends to avoid the load and latency issues described above. Additionally, the present invention enables a user to create and/or edit project data without having to be connected to the project server/database.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Operating Environment

Figure 1:
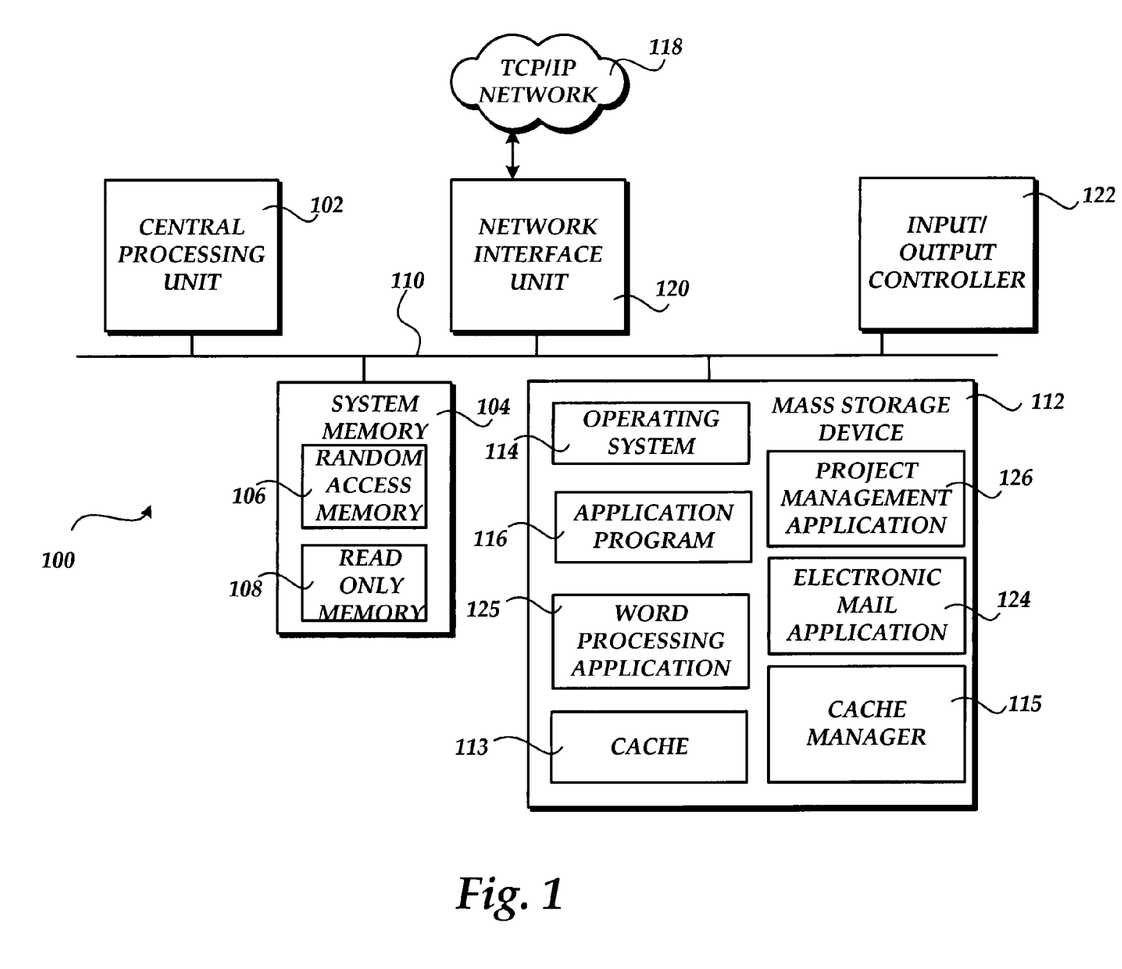
FIG. 1 illustrates an exemplary computing system for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 100 for practicing the various embodiments of the invention will be described. The computer architecture shown in FIG. 1 illustrates a conventional personal computer, including a central processing unit 102 ("CPU"), a system memory 104, including a random access memory 106 ("RAM") and a read-only memory ("ROM") 108, and a system bus 110 that couples the memory to the CPU 102. A basic input/output system containing the basic routines that help to transfer information between elements within the computer, such as during startup, is stored in the ROM 108. The personal computer 100 further includes a mass storage device 112 for storing an operating system 114, application programs, such as the application program 116, and data.

The mass storage device 112 is connected to the CPU 102 through a mass storage controller (not shown) connected to the bus 110. The mass storage device 112 and its associated computer-readable media, provide non-volatile storage for the personal computer 100. According to embodiments of the invention, the mass storage device 112 includes a hard disk having a local or client cache 113. As described below, computer 100 also includes a cache manager application 115 for managing save and/or load operations to and from the cache 113. Although the description of computer-readable media contained herein refers to a mass storage device, such as a hard disk or CD-ROM drive, it should be appreciated by those skilled in the art that computer-readable media can be any available media that can be accessed by the personal computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 100 may operate in a networked environment using logical connections to remote computers through a TCP/IP network 118 or other network, such as the Internet. The personal computer 100 may connect to the TCP/IP network 118 through a network interface unit 120 connected to the bus 110. It should be appreciated that the network interface unit 120 may also be utilized to connect to other types of networks and remote computer systems, such as local, wide-area, and other networks. The personal computer 100 may also include an input/output controller 122 for receiving and processing input from a number of devices, including a keyboard or mouse (not shown). Similarly, an input/output controller 122 may provide output to a display screen, a printer, or other type of output device.

As mentioned briefly above, a number of program modules and data files may be stored in the mass storage device 112 and RAM 106 of the personal computer 100, including an operating system 114 suitable for controlling the operation of a networked personal computer, such as the WINDOWS operating systems from Microsoft Corporation of Redmond, Wash. The mass storage device 112 and RAM 106 may also store one or more application programs. In particular, the mass storage device 112 and RAM 106 may store an application program 116 for providing a variety of functionalities to a user. For instance, the application program 116 may comprise many types of programs such as a spreadsheet application program, an electronic mail application program 124, a word processing application program 125, a database application program and the like. According to embodiments of the present invention, a project management application program 126 is included for preparing project management schedules as described herein. An example project management application for use in accordance with the present invention is Project Professional and Project Server, manufactured by Microsoft Corporation.

Figure 2:
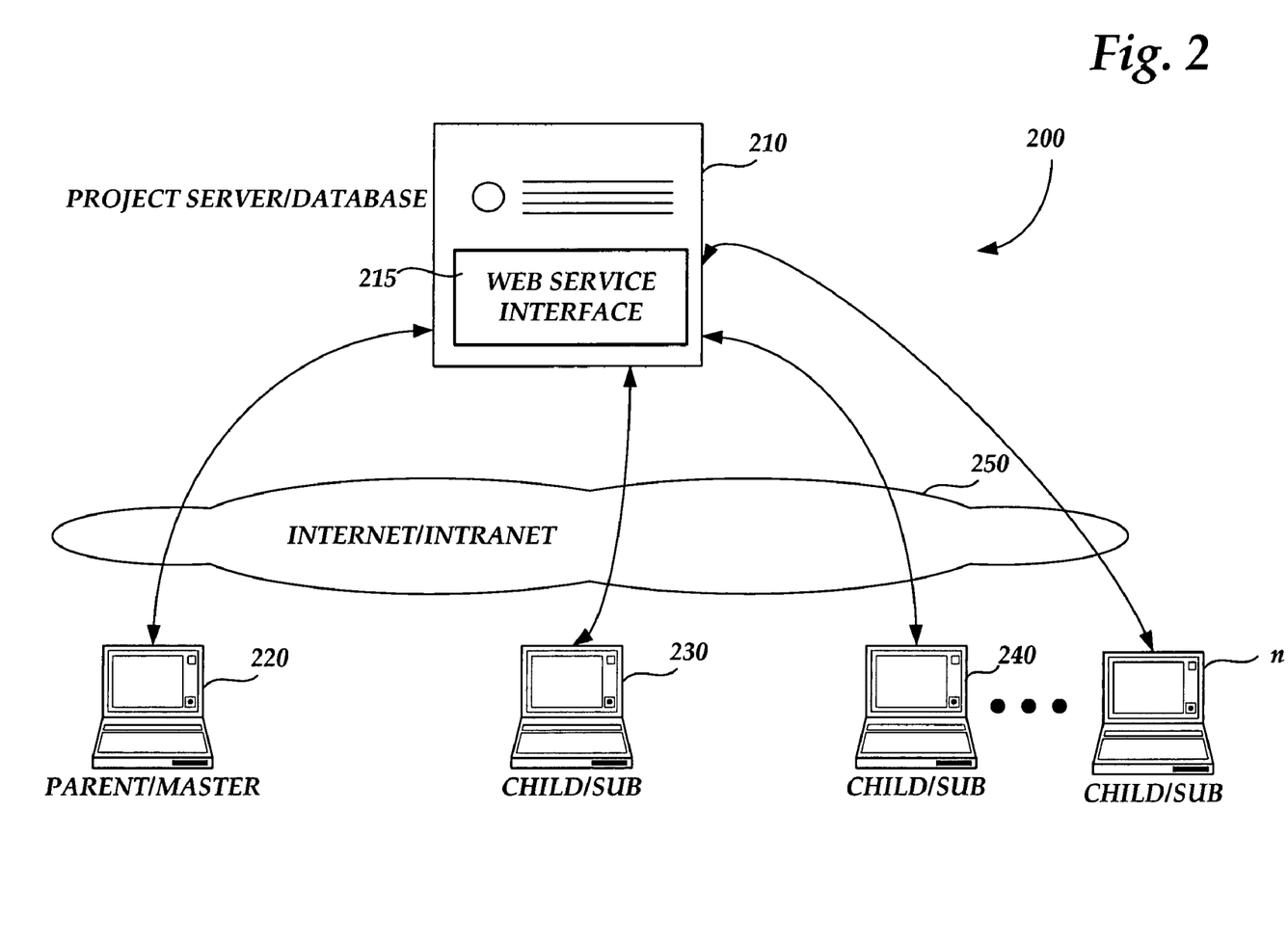
FIG. 2 is a simplified block diagram of a distributed computing environment depicting interrelationships between the owners/managers of a parent project and one or more child sub-projects in communication with a project server/database according to embodiments of the present invention.

Referring now to FIG. 2, a simplified block diagram of a distributed computing environment 200 is shown. The distributed computing environment 200 enables owners/managers of a parent project and one or more child sub-projects to communicate with a project server/database 210 using web service interface 215 for creation and maintenance of a project schedule according to embodiments of the present invention. The distributed computing environment 200 illustrated in FIG. 2 serves as an exemplary operating environment for embodiments of the present invention. As described herein, an overall project schedule may be comprised of a parent project schedule and one or more hierarchically related child sub-projects.

The project server/database 210 is a general purpose computing system having components including an operating system, a processor and memory space as described above for the computer 100 illustrated and described with reference to FIG. 1. The project server/database 210 also includes a project management application 126 having sufficient computer executable instructions for constructing, displaying and allowing management of the overall/parent project schedule and of the individual child sub-project schedules described herein.

The project server/database 210 also includes a backend or relational database for maintaining data associated with the parent project schedule and for each of the individual child sub-project schedules. As should be understood by those skilled in the art, the relational database allows for information stored associated with one project schedule to be related to one or more other project schedules for exchanging stored data between disparate project schedules comprising the overall or parent project schedule described herein.

As illustrated in FIG. 2, the parent/master computer system 220 is illustrated for communication with the project server/database 210 via a distributed computing system such as the Internet or intranet 250. One or more child/sub-project computing systems 230, 240, . . . , n are illustrated for communicating with the project server/database 210 via the Internet or intranet 250. As should be appreciated, the computing systems 220, 230, 240, . . . , n operated by the owners/managers of the parent project schedule and of one or more child sub-project schedules comprising the parent project schedule may include the processing and memory functionality described above with reference to the computer 100, illustrated in FIG. 1. Each computer, parent and child, may be described a "peers" of the system.

Each of the individual computing systems 220, 230, 240, . . . , n may also include a project management application 126 described above with reference to FIG. 1, and serving as client-side project management applications to a corresponding project management application 126 operated at the project server/database 210. According to embodiments of the present invention, the project server/database 210 may also include or may be operative to access an electronic mail application 124 for sending automatic project schedule changes to and from owners/managers of the parent project schedule and the child sub-project schedules.

The owner/manager of the parent project schedule may create a project schedule from the computing system 220 via the Internet or intranet 250 to the project server/database 210. Creation and maintenance of individual child sub-project schedules may likewise be created by owners/managers of the child sub-project schedules from the computing systems 230, 240, . . . , n via the Internet/intranet 250 to the project server/database 210. Notifications between the owners/managers of the parent project schedule and the one or more child sub-project schedules may be affected automatically by a communications application such as the electronic mail application 124 upon command by the project management application 126. That is, when a change or proposed change requires notification to the owner/manager of an affected project schedule or related sub-project schedule, the project management application 126 at the project server/database 210 may call a communications application such as the electronic mail application 124 and cause an appropriate notification message to be sent to the affected party. As should be understood by those skilled in the art, other forms of communication may be utilized for notification of affected parties including instant messaging systems, telephonic systems, and the like.

As is appreciated by those skilled in the art of project management methods and systems, a given project may include a number of tasks that must be completed and each task may be constrained by available resources and a required duration of time for completion of the task. Moreover, some tasks may not be initiated until the completion of a related task. For many projects, individual tasks comprising a given project are managed and processed under a separate and related project schedule. For example, a master project schedule may be prepared for constructing a house. The master project schedule may include three phases or tasks such as general framing, electrical and plumbing. Each of the phases or tasks of the master project may be completed by a subcontractor who constructs and manages his/her own project schedule for a given phase or task. For example, a first sub-project schedule may be constructed for general framing, a second sub-project schedule may be constructed for electrical work, and a third sub-project schedule may be constructed for plumbing work. As should be appreciated, each of the sub-project schedules may be broken into one or more phases or tasks which may, in turn, be associated with additional sub-projects for completion of one or more tasks within a given sub-project.

Saving/Loading Project Management Data

According to various aspects of the invention, project management data may be loaded and saved to a local cache 113, such as a hard disk cache of a mass storage device 112 of the client computing system 100. Many of the load and latency issues discussed above may be avoided when intelligently saving and loading project management data to the client cache 113. The invention provides a mechanism for reducing the size of data downloaded from and sent to the project server/database 210 during load and save times.

According to one aspect of the invention, when triggered, a cache manager 115 communicates with the web service interface 215 which intelligently saves and loads data to and from the backend database of the project/server database 210. As described below, the cache manager 115 may be responsible for storing, manipulating, and managing project data, while also interacting with the project server/database 210. The cache manager 115 also provides an interface, allowing an administrator to manipulate the cache 113.

Project server/database 210 enables online collaboration between project managers, team members, and various individuals and organizations that are actively involved in a project or whose interests may be affected by a project. Project server 210 also enables an organization to share standards across projects, help secure projects with check in and check out capability, view resource availability and other resource information across projects, and manage and report on portfolios of projects.

From the parent/master computer 220, project managers may utilize the project server/database 210 to do a number of things: 1) Assign tasks to team members and keep track of completed work to thereby automatically or manually accept task updates from team members and incorporate the updated information into a project; 2) Request and receive status reports in a particular and consolidate individual status reports into one project status report to present to others; 3) Perform what-if analysis to compare costs, schedules, and resource allocation after creating different versions of their project; 4) Assess the effect of schedule changes on resource availability, resource allocation, and costs; and/or 5) View resource availability across an organization and build a team so to assign generic resources to tasks, find and substitute resources based on a skill set, and build teams from a common list of enterprise resources.

From a child/sub computer, such as computer 230, various team members may access information on the project server/database 210 by using the web service interface 215, such as Project Web Access manufactured by Microsoft Corporation, to: 1) Review and update task assignments and respond to the project manager about certain assignments, and send updates about completed work at regular intervals; 2) Create new tasks and send them to the project manager for approval and incorporation into the project plan; 3) Delegate tasks to other team members; 4) View tasks in a Gantt Chart format for a graphic representation of the duration of tasks and relationships to other tasks; 5) View grouped, sorted, and filtered tasks; and/or 6) View the latest information for the entire project, not just assigned tasks. Other project managers or executives, can also access information on the project server/database 210 using the web service interface 215 to review project, task, and resource information, to see how projects are progressing, individually, or across an organization.

Figure 3:
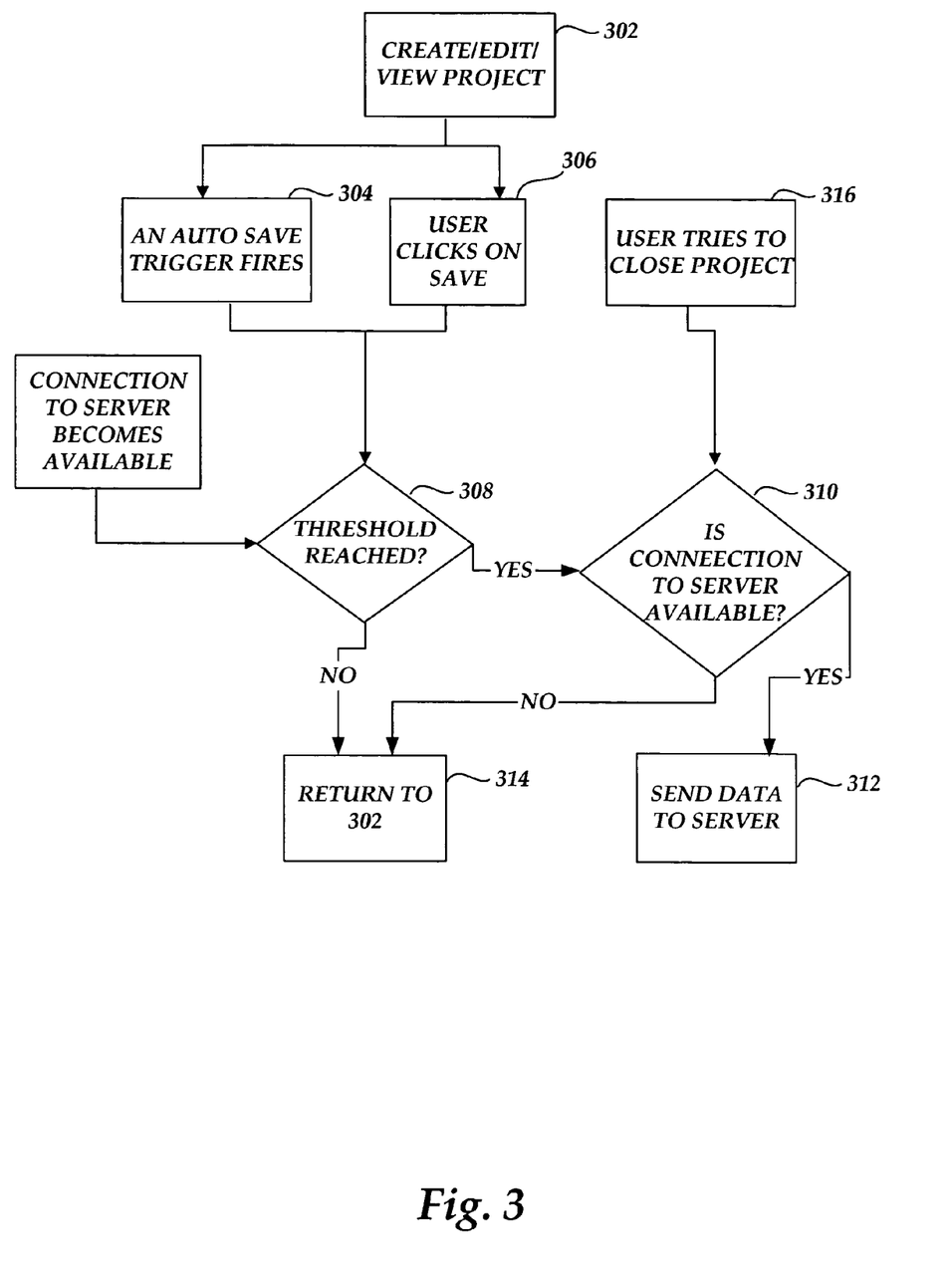
FIG. 3 depicts a flow diagram according to an embodiment of the present invention.

Referring now to FIG. 3, a flowchart is depicted according to one embodiment of the invention. As described above, a project manager utilizes a project management application 126 to create or modify a project, such as a new building construction project, for example (block 302). The project management application 126 is operable to receive user input and adjust project related data accordingly. The project management application 126 includes operability to save project-related data automatically, via an automatic save function (block 304), or the user may manually save project-related data (block 306) using a designated function key or interfacing with the project menu (i.e. using standard "file" and "save" buttons).

According to the invention, project-related data is saved to the project server/database 210 in an asynchronous manner. That is, project-related data is saved to the project server/database 210 when a threshold (discussed below) is met rather that when a user presses the save button. Project-related data may include: 1) projects; 2) tasks; 3) resources; 4) constraints among tasks; 5) assignments of tasks to resources; 6) project and resource views; 7) calendars—define working and non-working hours and days; and/or 8) lookup tables: user defined tables that specify acceptable values for user definable columns.

When a user, such as a project manager, creates a project for the first time on a client computer, such as computing system 100, project-related data is stored in the cache 113. After a project is created, project-related data is also stored in the cache 113 when a user modifies the project, such as be adding, updating, or deleting project data. However, according to embodiments of the invention, a particular project must be "checked out" by a user before modifying the project. The particular project must be checked back in before another user may modify the project. This check-in/check-out process prevents unauthorized modification of a project.

As described above, the operating environment allows multiple users to access projects using the project server/database 210 via the Internet. As described below, project information is periodically sent to the project server/database 210. More particularly, only "new" information is sent to the project server/database 210 when a certain threshold is met. This "new" information is referred to as a "difference" or "delta" of the data. Furthermore, when a client attempts to access a project from the project server/database 210, only "new" information is transferred to the client to update a project. Load/latency issues tend to be avoided by only loading a portion of the project from the project server/database 210.

According to an embodiment of the invention, the cache 113 maintains metadata information about all files loaded or saved by the client computer 100. The metadata information includes, but is not limited to, a local file path, last synchronization time with the project server/database 210, various version stamps, and/or other information for each project. A synchronization time refers to a time when the client computer and the project server/database 210 interact to update a particular project file. A version stamp is preferably stored in the client cache 113 each time the client computer 100 communicates with the project server/database 210.

According to an embodiment of the invention, a version stamp is an 8 byte number, which may represent the current time on the server, or it may be an auto-incremented 8 byte number. The version stamp is always preferably assigned by the project server/database 210. When the project server/database 210 receives new or updated data from a client, it generates a version stamp (either current time at the project server/database 210, or an auto-incremented number based on previous version stamp associated with the project being updated) and associates the version stamp with the project. The project server/database 210 also returns the new version stamp to the client. The next time the client wants to receive updated data, it sends the version stamp to the project server/database 210, and the project server/database 210 returns data that is newer than the client's version stamp. The client treats the version stamp as an opaque 8 byte number. It will be appreciated the greater or fewer bytes may be used for the version stamp. For every incremental save, either automatic or manual, the client computer, using metadata and other information, keeps track of any changed data properties related to a particular project. The cache manager 115 accumulates all the properties that are modified between saves and stores them in the cache file 113.

According to one embodiment of the invention, the cache manager 115 organizes the modified properties into three distinct categories: new data, updated data, and deleted data, according to one embodiment of the invention. The cache manager 115 then stores the modified properties according to each category in the cache 113.

At block 308, once a certain threshold is reached, the cache manager 115 prepares the difference of the data to send to the project server/database 210 for updating the particular project file stored on the project server/database 210. As a user edits project data, the project management application 126 keeps track of the pieces of data that are added, modified, or updated. According to an embodiment of the invention, if the cache 113 includes data updates which meet a threshold of at least about ten percent of the total project size, the cache manager 115 prepares a difference or delta of the data to send to the project server/database 210 for updating the particular project file stored on the project server/database 210. According to an alternative embodiment of the invention, if a certain percentage of project tasks have been modified, thirty percent for example, the cache manager 115 prepares the delta of the data to send to the project server/database 210 for updating the particular project file stored on the project server/database 210.

If the threshold has been reached, at block 310, it is determined whether the client computer 100 is connected to the project server/database 210. If the threshold has not been reached, at block 314, the flow returns to block 302 and the user may continue to modify and/or view the project or open a different project. If the client computer 100 is connected to the project server/database 210, at block 312, the data is sent to the project server/database 210. If the client computer 100 is not connected to the project server/database 210, at block 314, the flow returns to block 302. It will be appreciated that the client may be connected to the project server/database before checking the threshold.

The backend database of the project server/database 210 includes a number of primary tables corresponding to each of the project entities: project, resource, task, calendar, etc. Each row in a table may include a version stamp corresponding to a creation time, and/or a version stamp corresponding to a last modification time. The database also includes a corresponding "shadow" table for each primary table. For example, there are shadow tables for tables corresponding to projects, tasks, resources, calendars, etc. When a row is deleted from a primary table, its key is recorded in the corresponding shadow table along with the time of deletion. A "key" may represent a column in a table that uniquely identifies a record in a table. According to an embodiment of the invention, a combination of Globally Unique Identifiers (GUIDs) may be used for keys.

For example, a project may be uniquely identified by a GUID. A task in a project may likewise be uniquely identified by its own GUID, and the GUID of the project that it belongs to, and so on.

As described herein, the data sent from the client computer to the project server/database 210 includes new data, modified data, and deleted data. The server first determines a new version stamp for the project, either based on the current time at the server, or by incrementing the current version stamp. For the new data, new rows are created in corresponding project server/database 210 tables with the new version stamp as version of creation and/or version of last modification (i.e. associated version stamps). For the updated data, data in the corresponding project server/database 210 tables is updated with the corresponding new version stamp. The updated rows include the new version stamp as the version when the data was last modified. For deleted data, rows are deleted from the corresponding server/database 210 tables. For each deleted row, a row is added to a corresponding shadow table noting the new version stamp and the key of the corresponding primary row.

For an example of how delta computation is done at the project server/database 210 and at the client, consider the following scenario. For this example, suppose that we have a table, "Projects", includes columns "Project ID", "Project Name" and "Version Stamp". The "Project ID" column is the key for the "Projects" table. Another table, "Tasks", includes columns "Project ID", "Task ID", "Task Name", "Duration", and "Version Stamp". The columns "Project ID", and "Task ID" are the keys for table Task. Another table, "TaskShadow", is used to keep track of deleted tasks. It has columns "Project ID", "Task ID", and "Version Stamp". Assume that the tables are empty at first.

Continuing with the example, suppose a user "User1" creates a new project P1 with three tasks, task T1 with a duration of 2 days, task T2 with a duration of 3 days, and task T3 with a duration of 5 days. The user creates the project using a project management application 126, such as Project Professional, manufactured by Microsoft Corporation. When User1 chooses to save the project, assume that the cache manager 115 decides that it has enough data to send to the project server/database 210. Since this is a new project, all the data is put in the "new data" bucket, and sent to the project server/database 210. The project server/database 210 inserts the new data into the project server/database 210 database tables, which might have the following data when the project server/database 210 is finished updating the backend database:

| PROJECT | | |
|---|---|---|
| Project ID | Project Name | Version Stamp |
| 1 | P1 | 1 |

| TASKS | | | | |
|---|---|---|---|---|
| Project ID | Task ID | Task Name | Duration | Version Stamp |
| 1 | 1 | T1 | 2 | 1 |
| 1 | 2 | T2 | 3 | 1 |
| 1 | 3 | T3 | 5 | 1 |

| TASKSHADOW | | |
|---|---|---|
| Project ID | Task ID | Version Stamp |

The project server/database 210 returns the current version stamp value of "1" to the client. The cache manager 115 records that it has version "1" of project P1 in its cache 113 for User1. User1 then checks in project P1.

Now suppose that another user User2 tries to open project P1. Since the cache manager 115 determines that it does not have project P1 in its cache 113 for User2, it sends a request to the project server/database 210 for project P1 data, with a version stamp of 0. At this point, the project server/database 210 retrieves all records from the two tables above with a version stamp greater than 0. Since all rows have a version stamp greater than 0, all rows are retrieved. The project server/database 210 then returns the row for project P1, and the rows for tasks T1, T2, and T3 as new rows to the client with the current version stamp value of "1", with no rows for deleted data. When the client receives the data, the cache manager 115 adds it to the cache 113, and records that it has project P1 with version stamp 1 in its cache for User2.

Now assume that User2 decides to delete task T2, change the duration of task T3 to 4 days, and add a new task T4 with a duration of 3 days. The project management application 126 tracks the user activity to determine that a task has been deleted, another has been modified, and a new task has been created. When User2 decides to save and check in the project, the cache manager 115 puts task T2 in the deleted data bucket, task T3 in the updated data bucket, and task T4 in the new data bucket. It then sends the buckets to the project server/database 210. When the project server/database 210 receives the data, it applies the deleted data bucket to delete task T2 from the Tasks table, and add it to the TaskShadow table. It also updates task T2 and inserts the new task T4 to the table Tasks. All these changes get the next higher version stamp value of "2". So after the changes have been made, the tables have the following data:

| PROJECT | | |
|---|---|---|
| Project ID | Project Name | Version Stamp |
| 1 | P1 | 1 |

| TASKS | | | | |
|---|---|---|---|---|
| Project ID | Task ID | Task Name | Duration | Version Stamp |
| 1 | 1 | T1 | 2 | 1 |
| 1 | 3 | T3 | 4 | 2 |
| 1 | 4 | T4 | 3 | 2 |

| TASKSHADOW | | |
|---|---|---|
| Project ID | Task ID | Version Stamp |
| 1 | 2 | 2 |

The project server/database 210 then returns the latest version stamp value of "2" to the client. The cache manager 115 records that it has version "2" of project P1 in its cache 113 for User2.

Continuing with this example, now assume that User1 tries to open project P1 again. At that point, the cache manager 115 determines that it has version "1" of project P1 in its cache 113 for user User1, and sends a request to the project server/database 210 asking for updates to project "P1" since version "1". The project server/database 210 determines that it has one deleted task record (task T2 with Task ID value of 2), and two new or updated task records (tasks T3 and T4) with version values greater than "1". The project server/database 210 puts task T2 (with Task ID 2) in the deleted data bucket, and tasks T3 and T4 in the new data bucket and sends them to the client along with the current version stamp value "2". The cache manager 115 deletes task T2 from its cached copy of the project, determines that it already has an older version of task T3 and updates it with data from the project server/database 210, and creates a new task T4 based on data from the project server/database 210. It then records that it has version "2" of project P1 in its cache 113 for User1. At this point, the cache 113 for User1 is fully synchronized with the server version of project P1.

As described above, after the client computer sends the data to the project server/database 210, the project server/database 210 sends a current version stamp to the client computer as the modification time of the particular project on the project server/database 210. The cache manager 115 of the client computer 113 records the version stamp in the cache 113 as the latest synchronization time for that project.

Thus, while the cache 113 maintains any changes to the project data properties, the modified data is not updated on the project server/database 210 side until the threshold is reached and a connection to the project server/database 210 is available. Additionally, when a connection is available, data of a particular project is updated by transferring modified data from the project server/database 210 to the project application on the client computer, herein referred to as "synchronizing." This is particularly important when, for example, a project manager opens a project file on his computer and unbeknownst to the project manager, a previous project manager had modified the project. The synchronizing step ensures that the project manager has the latest project version.

Once triggered by reaching the threshold, as described above, any data that is sent to the project server/database 210 from a client computer 100 is a difference of the latest copy residing in the project server/database 210 and the copy that is residing in the cache 113. Similarly, any data that is loaded from the project server/database 210 to the computing system 100 is a difference of the latest copy in the cache 113 and the copy residing in the project server/database 210. By only sending or downloading a difference or delta of the data, the invention tends to reduce the amount of data transacted between the computing system 100 and the project server/database 210 thus improving efficiency and performance.

As described above, when saving data from client computer to the project server/database 210, the web service interface 215 saves asynchronously to the database by putting the data to be saved in a queue. The cache manager 115 communicates with the web service interface 215 which saves the data to the backend database of the project server/database 210. A low priority thread processes the queue and updates the data in database. The client when doing the next save, polls the project server/database 210 for the status of the save. If the save failed for some reason, it resends all the data to the project server/database 210 for saving. If the user closes the application and there is more data to be saved, it notes that there is a pending save and retries the save, the next time user goes online.

When a user wishes to load a project from the project server/database 210, the cache manager 115 sends a request to the project server/database 210 with the project ID and a version stamp signifying the last time the project was synched to the project server/database 210. The client computer sends a "0" if data was never synchronized for a project. During a load operation, the data may be divided into two categories or bins: 1) Data that is absolutely necessary for the project management application to provide to a user; and 2) data that may be downloaded on a separate thread when user is doing something else.

During the download, the web service interface 215 queries the database of the project server/database 210 for the project data and it streams the delta of the data to the client computer. The cache manager 115 applies the delta received by project server/database 210 on the project copy in the cache 113, thereby providing the latest data to the user without having to download the entire file. By dividing the data into two categories the user tends to have a better experience, without having to wait for a large amount of data to be downloaded from the project server/database 210.

In order to give control to user as soon as possible, it is preferred to download as little as possible and then download the remaining data in a background thread. Each of the entities (task, resource etc) has many attributes. Some of these attributes(properties) are required by the project management application 126 to make sense of the data in context of project. For example, a task has properties like, ID, start date, duration may be required for the project management application 126 to make sense of this task in context of the whole project. Other properties such as task name, its parent, group it belongs etc., may be downloaded in a background thread or when user tries to access this property. Preferably, the project management application 126 downloads core data for the rows it is displaying, and then downloads the remaining properties in a background thread.

After receiving a request, the project server/database 210 then queries all the primary tables in the backend database for rows with a version stamp greater than the version stamp sent by the client. Data corresponding to these rows is returned to the client computer as being either new or updated data for the project. The project server/database 210 also queries all the shadow tables associated with the primary tables for rows deleted later than the client provided version stamp. Data corresponding to these rows is returned to the client computer as deleted rows. The project server/database 210 returns the latest project version stamp to the client computer. Cache manager 115, using this version stamp, records in the cache 113 the time of last data synchronization for the project.

Thus, based on the transmitted version stamp, the project server/database 210 computes the delta (the "new" data) that needs to be applied to client computer and sends the first bin of data. After receiving the first bin of data, the client walks through the properties and updates the values stored in the cache 113 and loads the project, allowing the user to make changes to the file. At the same time, the project server/database 210 sends the second bin of data on a different thread and keeps updating the data as the user works with the project. If the user accesses data that was not downloaded, the program management application 126 alerts the user with a message box, while downloading the requested data.

Figure 4:
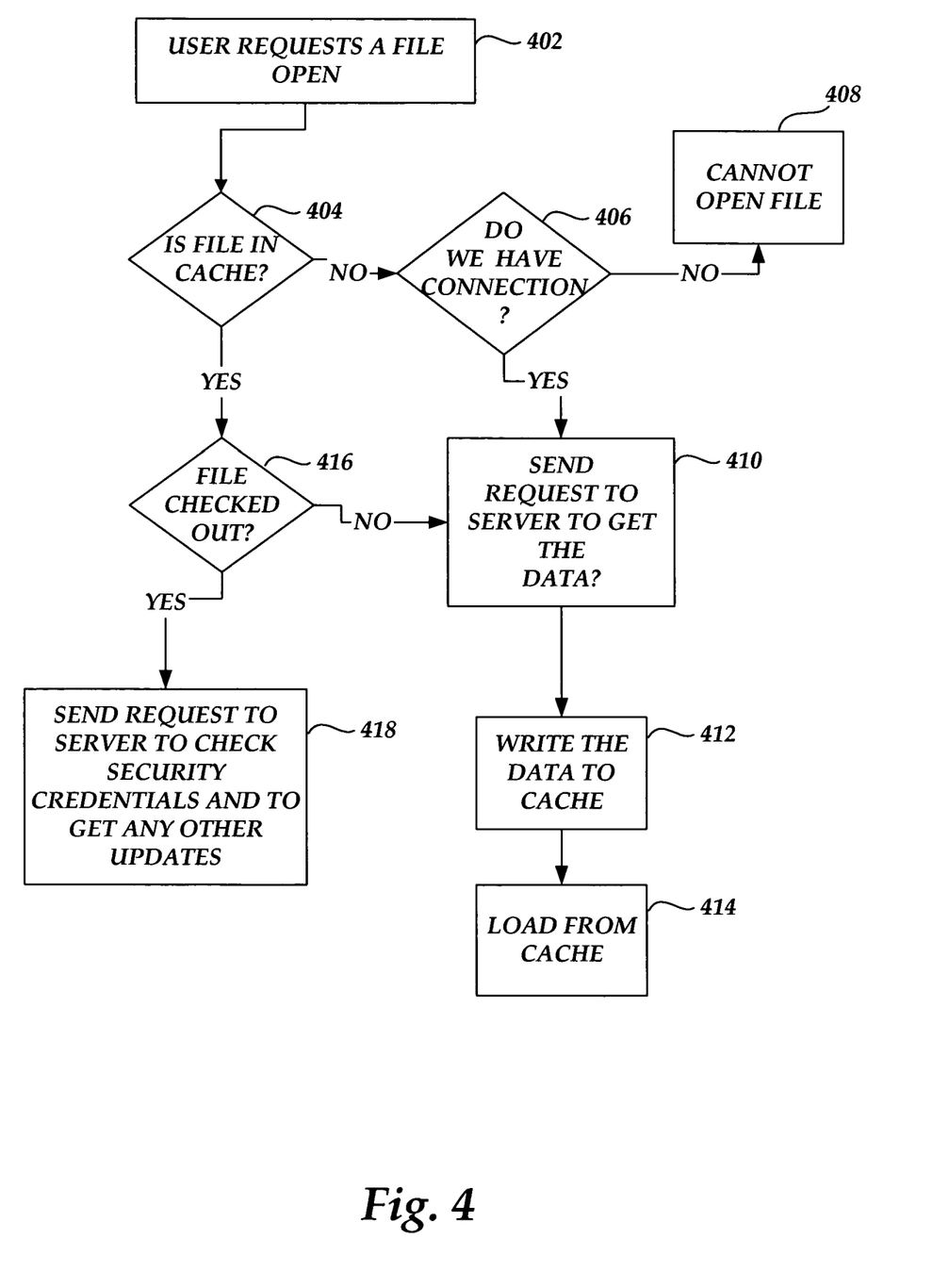
FIG. 4 depicts another flow diagram according to an embodiment of the present invention; and, FIG. 5 depicts yet another flow diagram according to an embodiment of the present invention.

Referring now to FIG. 4, a flow diagram is depicted for a connected project session, according to an embodiment of the invention. At block 402, a user, using a project management application 126 attempts to open a project file. At block 404, the cache manager 115 checks to see if the particular project file resides in the cache 113. A file may be present in the cache 113 if a user had opened the file previously for example. If the project file is not in the cache 113, at block 406, it is determined whether the client computer 100 is currently connected to the project server/database 210. If there is not a connection to the project server/database 210 and the file is not in the cache, then at block 408, the project management application 126 alerts the user that the file cannot be opened.

If there is a connection to the project server/database 210, at block 410, the cache manager 115 sends a request via the web service interface 215 to the project server/database 210, requesting the particular project file. The file is sent from the project server/database 210 to the client computer where the cache manager 115 stores the file in the cache 113 (block 412). At block 414, the file is loaded from the cache 113. At block 416, if the file is in the cache 113, the cache manager 115 determines whether the file is currently logged or checked out. If the file is checked out, at block 418, the cache manager 115, via web service interface 215, sends a request to the project server/database 210 to check for security credentials, such as whether the user still has a right to edit a file, etc. and to request any other updates, such as whether and administrator has forcibly terminated the user's check out of a file. At step 414, the file is loaded from the cache 113. If the file is not checked out at block 416, the flow continues to blocks 410-414, where, as described above, a difference of the data is sent to and loaded from the cache 113.

Figure 5:
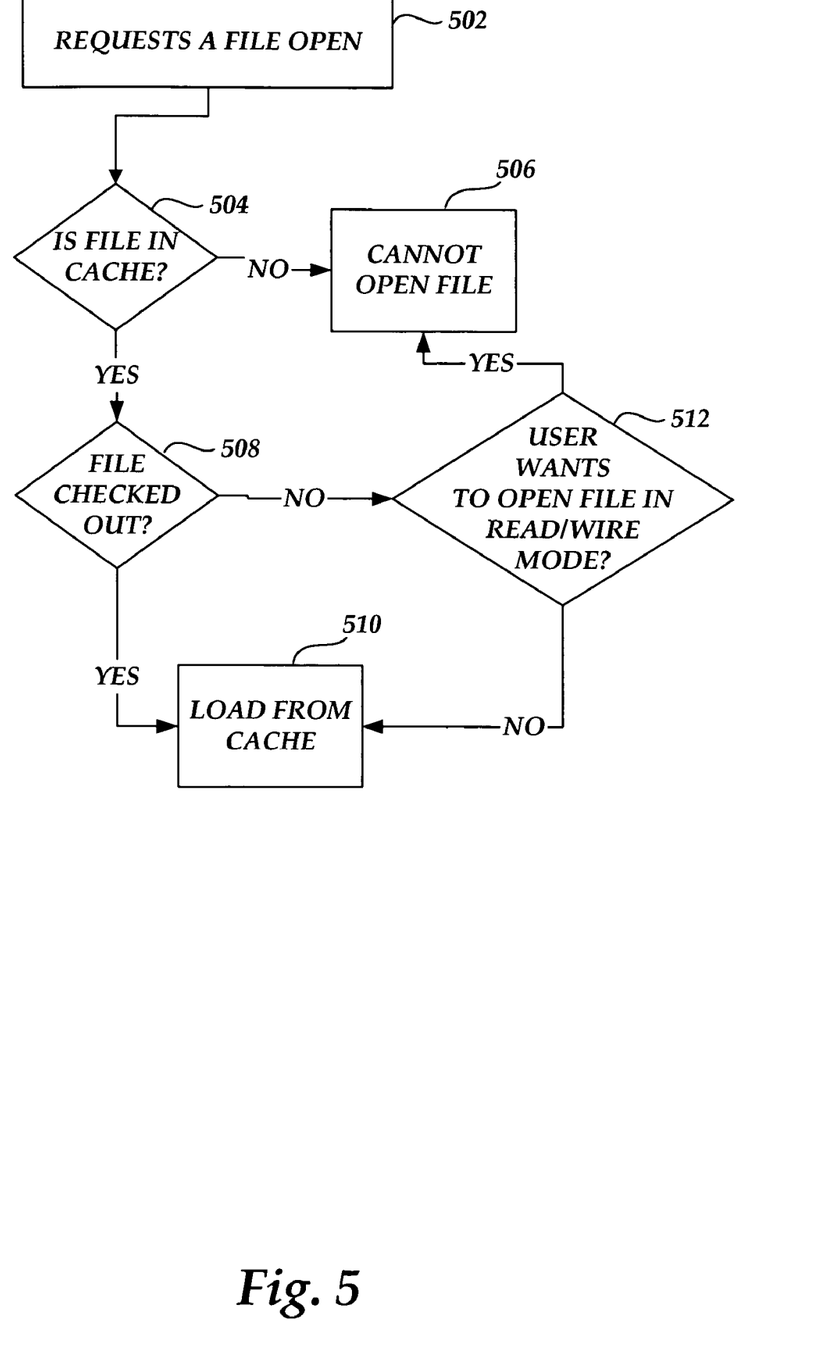

Referring now to FIG. 5, a flow diagram is depicted for a disconnected project session, according to an embodiment of the invention. As used herein, "disconnected" refers to a connection not being available between a client computer and the project server/database 210. Likewise, "connected" refers to a connection being available between a client computer and the project server/database 210. At block 502, a user, using a project management application, attempts to open a project file. At block 504, the cache manager 115 checks to see if the particular project file is stored in the cache 113. If the file is not in the cache 113, at block 506, the project management application alerts the user that the file cannot be opened.

If the file is in the cache 113, at block 508, the cache manager 115 determines whether the file is checked out. At block 510, if the file is checked out, the file is loaded from the cache 113. If the file is not checked out, at block 512, the user is prompted to open the file in a read-only mode. If the user agrees to open the file in read-only mode, the file is opened from cache in read only mode. If the user wants to edit the file, the file is not opened.

As described above, since the client computer can interface with the local cache 113, users can work on the client even if they are offline. While offline, users may create new projects, or edit an existing project when it is checked out. When working offline, the cache manager 115 stores all data to the cache 113. The next time the user connects to the project server/database 210, and upon reaching a threshold, certain validation checks are performed and synchronization between the files in the cache 113 and the project server/database 210 take place.

It is expected that most users will use HTTPS for secure communication between clients and the project server/database 210. According to embodiments of the invention, a client and project server/database 210 exchange data in a proprietary binary format. The data may also be compressed for better bandwidth utilization. Preferably, a checksum is computed for the uncompressed data and is sent along with the data to the project server/database 210. Both the client and the project server/database 210 compute the checksum of the data after uncompressing it, and validate computed checksum against received checksum as part of the security validation.

As described above, Project Professional is a project management application manufactured by Microsoft Corporation. Project Server is another application offered by Microsoft which enables a plurality of users to create new projects and access ongoing projects from a project server, such as project server/database 210, described above. For example, one organization may install Project Server on a dedicated server and then a number of project managers may install Project on individual computing systems, wherein each system is in communication with the project server.

As described herein, methods and systems are provided for caching and synchronizing projects using a project management application and associated resources. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A computer-implemented method for managing project data synchronization between a project management application of a client device and a project server, the computer-implemented method comprising:
   on the client device, obtaining a copy of a complete project schedule stored on a project server, wherein the copy of the project schedule includes a plurality of project tasks, wherein the copy of the project schedule is stored in a cache memory of the client device, wherein the cache memory includes a table of project tasks, separate from the copy of the project schedule, wherein each of the project tasks include a version stamp that indicates a version for the project task;
   on the client device, receiving a change to at least one project task of the plurality of project tasks of the copy of the project schedule; wherein the change is maintained in the cache memory of the client device;
   determining, by a cache manager of the client device, whether the change includes data updates of a size that meets a preset change threshold stored with the cache manager, wherein the change threshold is a percentage threshold of a permitted amount of data updates maintained in the cache memory in relation to the total data of the copy of the project schedule stored in the cache memory;
   upon determining that the change threshold has been met, causing the cache manager of the client to:
      identify properties of each change of the data updates that are maintained in the cache memory,
      send the properties of each change to the project server without sending properties of unchanged portions of the project schedule in order to cause an update to the project schedule stored on the project server with the properties of the change,
      receive an updated version stamp for each change from the project server, and
      update the table located in the cache manager with the version stamp.

2. The computer-implemented method of claim 1, further comprising causing the cache manager to generate a task update container, a new task container and a deleted task container.

3. The computer-implemented method of claim 2, further comprising:
   identifying, by the cache manager, that the properties of the change are related to an update to one of the plurality of project tasks,
   storing the change in the task update container;
   sending the task update container to the project server;
   receiving an updated version stamp for the change from the project server; and
   storing the updated version stamp in the table of the cache manager in association with the related task of the change.

4. The computer-implemented method of claim 2, further comprising:
   identifying, by the cache manager, that the properties of the change are related to a new task,
   storing the change in the new task container;
   sending the new task container to the project server;
   receiving an updated version stamp for the change from the project server;
   generating an indication of the new task in the table of the cache manager; and
   storing the updated version stamp in the table of the cache manager in association with the indication generated for the new task.

5. The computer-implemented method of claim 2, further comprising:
   identifying, by the cache manager, that the properties of the change are related to a deleted task,
   storing the change in the deleted task container;
   sending the deleted task container to the project server;
   receiving an updated version stamp for the change from the project server;
   removing an indication of the deleted task from the table of the cache manager;
   generating a task shadow table in the cache manager;
   generating an indication of the deleted task in the task shadow table of the cache manager; and
   storing the updated version stamp in the task shadow table of the cache manager in association with the indication generated for the deleted task.

6. The computer-implemented method of claim 1, wherein obtaining a project schedule that includes a plurality of project tasks includes obtaining a changed portion of the project schedule from the project server and updating a version of the project schedule stored in the cache memory to obtain a current version of the project schedule in the cache memory.

7. The computer-implemented method of claim 6, wherein obtaining the changed portion of the project schedule from the project server includes receiving the changed portion of the project schedule in two separate threads, wherein the first thread is a high priority thread that is received first by the cache manager, wherein the second thread is a low priority thread that is received second by the cache manager.

8. A computer-readable storage medium having computer executable instructions for managing project data synchronization between a project management application of a client device and a project server, the instructions comprising:
   obtaining a copy of a project schedule stored on a project server, wherein the copy of the project schedule includes a plurality of project tasks, wherein the copy of the project schedule is stored in a memory of a client device, wherein the memory includes a table of project tasks, separate from the copy of the project schedule, that include an indication of the plurality of project tasks in association with a version stamp;
   receiving a change to at least one project task of the plurality of project tasks of the copy of the project schedule; wherein the change is stored within the memory of the client device along with other data updates including changes to other project tasks that have not been sent to the project server;
   determining, by a memory manager, whether the change and the other changes previously made meet a preset change threshold of the memory manager; wherein the preset change threshold is a number of tasks that have been modified in relation to a total number of the project tasks;
   upon determining that the change threshold has been met, causing the cache manager of the client to:
      identify properties of the change,
      send the properties of the change to the project server without sending properties of unchanged portions of the project schedule in order to cause an update to the project schedule stored on the project server with the properties of the change,
      receive an updated version stamp for the change from the project server, and
      update the table located in the cache manager with the version stamp.

9. The computer readable storage medium of claim 8, wherein the change threshold is a percentage threshold of a permitted amount of changed data in relation to the total data of the copy of the project schedule stored in the memory.

10. The computer readable storage medium of claim 8, further comprising causing the memory manager to generate a task update container, a new task container and a deleted task container.

11. The computer readable storage medium of claim 10, further comprising:
   identifying, by the memory manager, that the properties of the change are related to an update to one of the plurality of project tasks,
   storing the change in the task update container;
   sending the task update container to the project server;
   receiving an updated version stamp for the change from the project server; and
   storing the updated version stamp in the table of the memory manager in association with the related task of the change.

12. The computer readable storage medium of claim 10, further comprising:
   identifying, by the memory manager, that the properties of the change are related to a new task,
   storing the change in the new task container;
   sending the new task container to the project server;
   receiving an updated version stamp for the change from the project server;
   generating an indication of the new task in the table of the memory manager; and
   storing the updated version stamp in the table of the memory manager in association with the indication generated for the new task.

13. The computer readable storage medium of claim 10, further comprising:
   identifying, by the memory manager, that the properties of the change are related to a deleted task,
   storing the change in the deleted task container;
   sending the deleted task container to the project server;
   receiving an updated version stamp for the change from the project server;
   removing an indication of the deleted task from the table of the memory manager;

generating a task shadow table in the memory manager;
generating an indication of the deleted task in the task shadow table of the cache manager; and
storing the updated version stamp in the task shadow table of the memory manager in association with the indication generated for the deleted task.

14. The computer readable storage medium of claim 8, wherein obtaining a project schedule that includes a plurality of project tasks includes obtaining a changed portion of the project schedule from the project server and updating a version of the project schedule stored in the memory to obtain a current version of the project schedule in the memory.

15. The computer readable storage medium of claim 14, wherein obtaining the changed portion of the project schedule from the project server includes receiving the changed portion of the project schedule in two separate threads, wherein the first thread is a high priority thread that is received first by the memory manager, wherein the second thread is a low priority thread that is received second by the memory manager.

16. A system for managing project data synchronization between a project management application of a client device and a project server, the system comprising:
a processor; and
a memory having computer executable instructions stored thereon, wherein the instructions execute for:
obtaining a copy of a project schedule stored on a project server, wherein the copy of the project schedule includes project tasks, wherein the copy of the project schedule is stored in a memory of a client device, wherein the memory includes a table of project tasks, separate from the copy of the project schedule, that include an indication of the plurality of project tasks in association with a version stamp;
receiving a change to at least one project task of the plurality of project tasks of the copy of the project schedule; wherein the change is maintained in the memory of the client device along with data updates;
determining, by a memory manager, whether the data updates that include the change meets a preset change threshold of the memory manager;
upon determining that the change threshold has been met, causing the cache manager of the client to:
identify properties of the change,
send the properties of the change to the project server without sending properties of unchanged portions of the project schedule in order to cause an update to the project schedule stored on the project server with the properties of the change,
receive an updated version stamp for the change from the project server, and
update the table located in the cache manager with the version stamp.

17. The system of claim 16, wherein the change threshold is a percentage threshold of a permitted amount of changed data in relation to the total data of the copy of the project schedule stored in the memory.

18. The system of claim 16, wherein the change threshold is a percentage of project task changes in relation to the plurality of project tasks of the project schedule.

19. The system of claim 16, further comprising causing the memory manager to generate a task update container, a new task container and a deleted task container.

20. The system of claim 19, further comprising:
identifying, by the memory manager, that the properties of the change are related to an update to one of the plurality of project tasks,
storing the change in the task update container;
sending the task update container to the project server;
receiving an updated version stamp for the change from the project server; and
storing the updated version stamp in the table of the memory manager in association with the related task of the change.

21. The system of claim 19, further comprising:
identifying, by the memory manager, that the properties of the change are related to a new task,
storing the change in the new task container;
sending the new task container to the project server;
receiving an updated version stamp for the change from the project server;
generating an indication of the new task in the table of the memory manager; and
storing the updated version stamp in the table of the memory manager in association with the indication generated for the new task.

22. The system of claim 19, further comprising:
identifying, by the memory manager, that the properties of the change are related to a deleted task,
storing the change in the deleted task container;
sending the deleted task container to the project server;
receiving an updated version stamp for the change from the project server;
removing an indication of the deleted task from the table of the memory manager;
generating a task shadow table in the memory manager;
generating an indication of the deleted task in the task shadow table of the cache manager; and
storing the updated version stamp in the task shadow table of the memory manager in association with the indication generated for the deleted task.

23. The system of claim 16, wherein obtaining a project schedule that includes a plurality of project tasks includes obtaining a changed portion of the project schedule from the project server and updating a version of the project schedule stored in the memory to obtain a current version of the project schedule in the memory.

24. The system of claim 23, wherein obtaining the changed portion of the project schedule from the project server includes receiving the changed portion of the project schedule in two separate threads, wherein the first thread is a high priority thread that is received first by the memory manager, wherein the second thread is a low priority thread that is received second by the memory manager.

* * * * *